Figure 1:
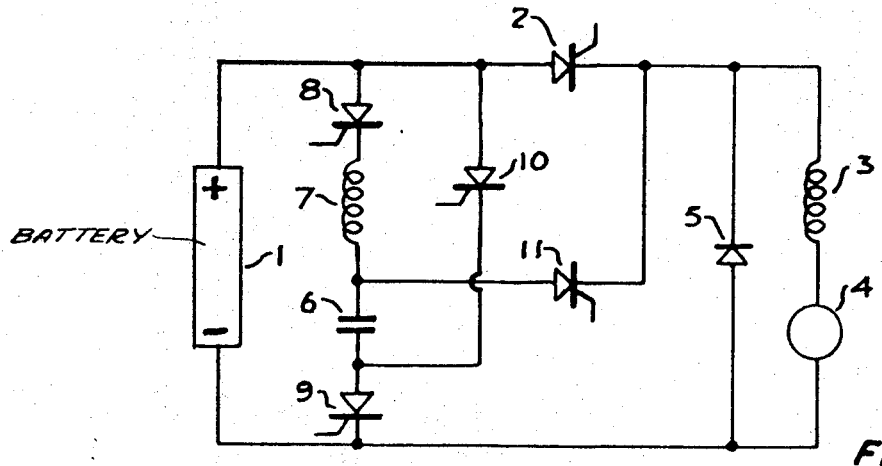

United States Patent

[11] 3,614,586

| [72] | Inventor | Kenneth G. King<br>London, England |
| --- | --- | --- |
| [21] | Appl. No. | 888,384 |
| [22] | Filed | Dec. 29, 1969 |
| [45] | Patented | Oct. 19, 1971 |
| [73] | Assignee | Westinghouse Brake and Signal Company, Limited<br>London, England |
| [32] | Priority | Jan. 13, 1969 |
| [33] | | Great Britain |
| [31] | | 1833/69 |

[54] ELECTRICAL CHOPPER REGULATOR CIRCUITS
6 Claims, 4 Drawing Figs.

[52] U.S. Cl............................................... 321/2,
321/44, 321/45 C, 307/252 M, 318/345
[51] Int. Cl............................................... H02m 3/32
[50] Field of Search........................................... 321/43–45,
2; 318/341, 345; 307/252.51, 252.55; 323/22 SC

[56] References Cited
UNITED STATES PATENTS

| 3,303,416 | 2/1967 | Paice et al. ................... | 307/252 |
| --- | --- | --- | --- |
| 3,354,322 | 11/1967 | Eastop.......................... | 307/252 X |
| 3,492,557 | 1/1970 | Brown........................... | 318/345 |
| 3,509,440 | 4/1970 | Johnston....................... | 318/227 |

FOREIGN PATENTS

| 1,063,733 | 3/1967 | Great Britain................ | 321/45 |
| --- | --- | --- | --- |

*Primary Examiner*—William H. Beha, Jr.
*Attorney*—Larson, Taylor and Hinds

ABSTRACT: An electrical chopper regulator circuit comprises a main controllable rectifier device connected in a current path between input and output terminals and a commutating capacitor connected in a second current path. Second and third controllable rectifier devices control connection of the commutating capacitor with appropriate polarity to opposite sides of the main controllable rectifier device so as to interrupt current flow in the main controllable rectifier device. A charging circuit for controlling charging of the commutating capacitor includes a switching device and an inductance through which current flows to charge the commutating capacitor to the correct polarity for commutating the main controllable rectifier device before firing of that device.

ELECTRICAL CHOPPER REGULATOR CIRCUITS

THis invention relates to electrical chopper regulator circuits and relates especially but not exclusively to such regulator circuits suitable for controlling the supply of power from a source to a DC motor.

According to the present invention there is provided an electrical chopper regulator circuit having a controlable rectifier device connected in a first current path between input and output terminals to operate as a current interrupter and the circuit including a commutating capacitor in a second current path including first switching means and an inductance, said second path being connected to enable charging of the capacitor via the input supply terminals on conduction of the first switching means and the capacitor being further connectable in a thus charged condition via further switching means to circuit points on either side of the controllable rectifier device to render the controllable rectifier device nonconducting.

By the expression "controllable rectifier device" there is meant herein a device of a type which can be rendered conducting in the forward direction on application of a triggering signal thereto and can only subsequently be rendered nonconducting when the current therein falls below a sustaining value for sufficient time for the device to regain its forward blocking capability.

By arranging that the communicating capacitor is connectable across the controllable rectifier device by respective switching means as aforesaid, it can be arranged that the one of the switching means can provide a current path through the inductance to enable a buildup of current in the inductance to occur prior to connection of the capacitor for recharging thereof and thereby affording a consequential enhancement of the charge on the capacitor. A technique of establishing charge on a communicating capacitor by first establishing a current in an inductance in a circuit of the chopped regulator type, has previously been proposed in British Pat. No. 1,020,590 but in that proposal the total charge on the capacitor is produced by energy initially stored in the inductance.

By adjusting the period of time during which current is allowed to flow in the inductance from the input terminals, the magnitude of current flowing in the inductance on transfer to the communicating capacitor can be adjusted to a desired level and accordingly the charge on the capacitor can be regulated in accordance with the turnoff requirements for the controllable rectifier device or to compensate for supply voltage variations.

Figure 2:
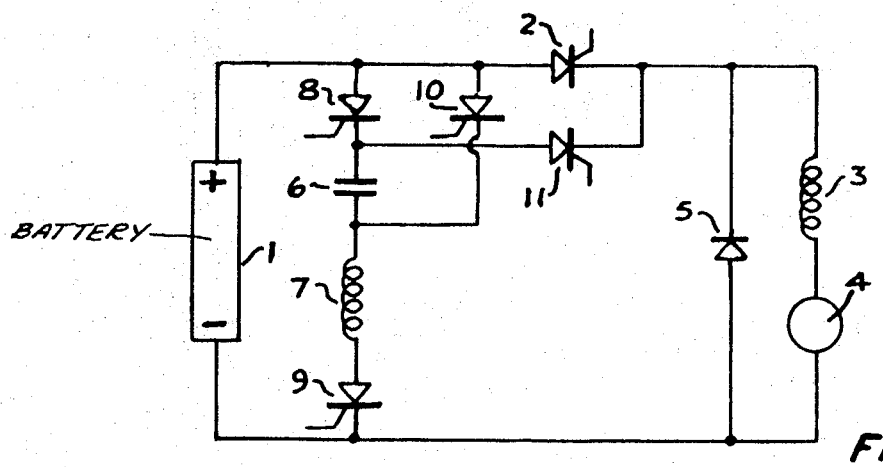
Figure 3:
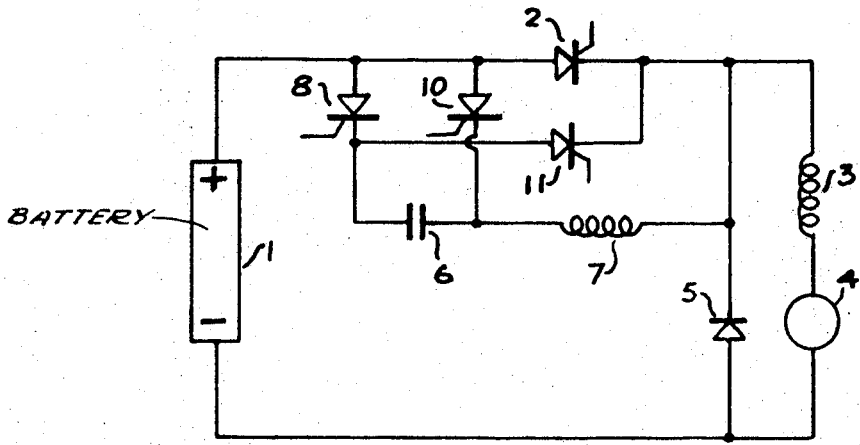
Figure 4:
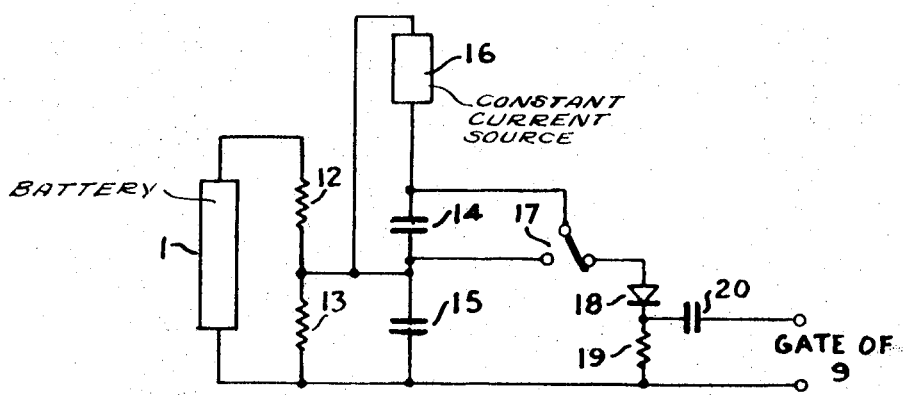

In order that the present invention may be more clearly understood, and readily carried into effect, the same will be further described by way of example with reference to the accompanying drawings of which:

FIG. 1 illustrates a basic circuit arrangement in accordance with the invention and, FIG. 2 and 3 illustrate modifications of the circuit arrangement of FIG. 1 and, FIG. 4 illustrates a timing circuit to be referred to.

Referring to FIG. 1 a battery source 1 is connected via a main semiconductor controllable rectifier device 2 to a series-wound DC motor carrying a field winding 3 and an armature 4 as shown. In parallel with the motor there is connected a conventional freewheeling diode represented by the reference 5. In a path across the input terminals to which the battery 1 is connected, there is provided a communicating capacitor 6 in series with an inductance 7 and respective switching devices in the form of controllable rectifier devices 8 and 9. The commutating capacitor 6 is connectable to points of the circuit on opposite sides of the main controllable rectifier device 2 via respective semiconductor controllable rectifier devices 10 and 11.

Before discussion of the precise operation of the circuit arrangement of FIG. 1, it may be made clear that the purpose of the circuit is to provide variable control of the mark-to-space ratio of the supply of current from the source 1 to the motor. This is achieved by varying the ratio of the conducting to nonconducting periods of the device 2. Such control may be achieved in a number of ways. For example, the frequency of operation may be maintained constant and the on and off periods of the device 2 may be varied complementarily. Alternatively, a constant on time for the device 2 may be provided, together with a variable off time or vise versa. In any case, it will be appreciated that by virtue of the freewheeling diode 5, the current in the motor is a substantially steady current while the current supplied via the device 2 is a pulsating current. The effect therefore is to control the means voltage applied to the motor.

In operation of the circuit arrangement of FIG. 1 assuming that the means are provided for applying triggering signals to the controllable rectifier devices 8, 9, 10 and 11 in a desired sequence, and assuring initially that no current is flowing in the motor and zero charge resides on the capacitor 6, the simultaneous application of triggering signals to devices 8 and 9 will enable capacitor 6 to charge resonantly from the supply via the inductance 7 and the devices 8 and 9 will become nonconducting naturally on attainment of a voltage of approximately twice the supply voltage of the capacitor 6. A typical charging time for the capacitor 6 under these conditions may be around 500 microseconds although variation of this value may be readily achieved in accordance with the requirements of the circuit. The main controllably rectifier device 2 may now have received a triggering signal for rendering it conducting to supply current from the source 1 to the motor and current is thereby established in the latter until the end of the desired "on" period is reached, at which point the devices 10 and 11 are rendered conducting to connect the capacitor 6 across the device 2. At this time, current is drawn by the motor via the capacitor 6 and the capacitor charge reverses to a value in which the plate of 6 adjacent to inductance 7 acquires a negative value relative to the lower plate and devices 10 and 11 become nonconducting due to the tendency for current reversal to occur therein. Motor current then continues to flow via the freewheeling diode 5.

Subsequently, the devices 8 and 9 again receive simultaneous triggering signals and the charge which resides on capacitance 6 at this instant is approximately equal to the supply voltage so that the resonant recharge of the capacitor 6 in the opposite direction which takes place via the inductance 7 and devices 8 and 9, attains a value which is approximately equal to three times the supply voltage. The capacitor 6 is thereby charged in readiness for the next commutation of the device 2, and the action is repetitive.

In a manner of operation in which advantage can be taken if the principle outlined in the specification of British Pat. No. 1,020,590, current may first be established in the inductance 7 before the current path between the supply terminals of the circuit and the capacitor 6 is completed. Thus, at the instant during the operation of the circuit as discussed above, at which the capacitor 6 is reverse charged with the plate adjacent to the inductance 7 at a negative potential, the devices 8 and 11 may be rendered conducting together and at this instant, current begins to flow via the inductance 7 to the motor. On attainment of a predetermined current level which may be sensed by suitable means, the device 9 is rendered conducting and current is now delivered from the device 11 to the device 9 and the device 11 becomes nonconducting and reacquires its forward-blocking capability by virtue of the reverse voltage applied across it due to the above-mentioned charge on the capacitor 6. The current which is thus established in the inductance 7 prior to the recharging of the capacitor 6 results in a substantial increase in the voltage which is finally acquired by the capacitor at the end of the charging interval and devices 8 and 9 again become nonconducting due to the tendency to reverse overswing of the resonant circuit including inductance 7 and capacitor 6. The extent of the increase may readily be controlled by varying the time interval between the application of triggering signals to the device 11 and 9. By suitable control means therefore the voltage to which the capacitor is charged successively can be maintained at a substantially constant value or it can be varied to adjust itself to the operating circumstances.

A suitable circuit arrangement for timing the firing of the device 9 following establishment of a certain current in the inductance 7 of the circuit of FIG. 1, is shown in FIG. 4. Here the object is to arrange that for reduced supply voltage of the battery 1, greater currents are established in inductance 7 before resonant recharge of capacitor 6 occurs by firing device 9.

In FIG. 4 the battery 1 is again shown and this is connected to a potential divider provided by resistors 12 and 13 which resistor 13 is connected across a capacitor 15. A DC constant current source which may, for example, comprise a conventional battery and zener diode arrangement is also provided represented by block 16 in a charging plan to a further capacitor 14 the potential across which and the capacitor 15 is connected via a static switch device 17 to a triggerable device 18 in a series with a resistor 19 to provide a capacitor 20 a triggering signal to the device 9 of FIG. 1 when the diode 18 fires. This occurs on a given voltage being reached across capacitors 14 and 15. The static switch 17 is normally in the position to that shown until the instant at which the device 11 of FIG. 1 is fired to initiate current in the inductance 7. Hence capacitor 15 is normally discharged and the capacitor 15 is held at a predetermined fraction of the battery volts by the potentiometer formed by 12 and 13. Accordingly, when the battery volts are low, a substantially long period of current flow to 14 occurs before the device 18 fires to initiate conduction of 9 whereas when the battery volts are high, the time taken for the voltage summed across 14 and 15 to reach the firing level of 18 is shorter and the device 9 is fired earlier to allow a shorter period of current flow in inductance 7 prior to resonant charge of the capacitor 6 and this is as required. Assuming that correct selection of the circuit constants a good degree of compensation of the charge on capacitor 6 for variation of battery volts can thus be achieved.

A modification of the arrangement shown in FIG. 1 is shown, as mentioned above, in FIG. 2, in which the positions of the circuit is basically identical with that of FIG. 1 assuming that operation without the establishment of an initial current in inductance 7 prior to the recharging operation of the capacitor 6. Where it is required to establish an initial current in the inductance 7 prior to recharging capacitor 6, however, the devices 9 and 10 are required to be rendered conducting at the instant at which the required reverse charge of the capacitor 6 is attained, following turnoff of the device 2. Devices 9 and 10 therefore, are required to receive substantially simultaneous triggering signals at this instant. In order to achieve this a triggering circuit may be readily visualized by those skilled in the art which will operate to produced triggering signals to device 9 and appropriate when an appropriate reverse voltage is present on capacitor 6. Triggering of the device 8 at a subsequent instant renders the device 10 nonconducting by virtue of the charge on the capacitor 6 and the charging process for the capacitor 6 is then completed as previously, a reversal of charge occuring on capacitor 6, which is enhanced by the energy already established in the inductance 7. In this circuit it will be seen that in contrast to the arrangement of FIG. 1, the turnoff circuit for the device 10 after establishment of the current in the inductance 7 is no longer includes the circuit output terminal and the load. Secondly, the establishment of current in the inductance 7 prior to recharging of the capacitor 6 and can be initiated if desired by triggering the device 9 at the instant at which devices 10 and 11 are triggered to render the device 2 nonconducting in normal operation.

In a further modification of the circuit arrangement of FIG. 2, bearing in mind that the second aspect just referred to, in which the device 9 is rendered conducting when devices 10 and 11 re rendered conducting to achieve turnoff of device 2, the device 9 being relieved of its previous function, may be omitted completely. Under these circumstances, it is inevitable that the establishment of current in the inductance 7 prior to the recharging of the capacitor 6 will begin on initiation of the turnoff operation of the device 2. This, it will be understood, may in certain circumstances be advantageous and in other circumstances it may be disadvantageous in that the substantially higher currents than are desirable may be established in the inductance 7 prior to the instant at which the device 8 can be triggered to render the device 10 nonconducting. However, by suitable selection of the circuit parameters and the operating frequencies involved, it is possible to provide a chopper regulator circuit including only three auxiliary drives in addition to the main controllable rectifier device or devices such as 2. This is achieved furthermore in a circuit which enables the establishment of a current in a charging inductance 7 prior to the recharging operation of the commutation capacitor such as 6, with the attendant advantages of this type of operation.

In a further modification of the circuit arrangement of FIG. 1, the circuit as modified in accordance with FIG. 2 has the controllable rectifier device 9 omitted and the lower end of the inductance 7 can be connected to the positive output side of the circuit as shown in FIG. 3. The manner of operation of this circuit is very similar to that of FIG. 2 with the device 9 omitted.

At the commencement of the operation, the device 8 is rendered conducting to charge the capacitor 6 via the inductance 7 and the motor circuit and in this changing operation, the charge on the capacitor 6 may be expected to attain a value which lies somewhere between the supply voltage and twice the supply voltage. The device 2 is then rendered conducting at a desired instant to initiate supply from battery 1 to motor and when it is subsequently required to be rendered nonconducting, the devices 10 and 11 have triggering signals applied to them and the controllable rectifier device 2 is reverse blocked by the capacitor voltage, the motor load drawing current via the capacitor 6 until the charge of the capacitor is reversed and the device 11 becomes nonconducting. The inductance 7 begins to receive current from the supply when the supply voltage across 2 has become positive, that is when the turnoff interval has elapsed. On subsequent triggering of the device 8 into the conducting condition to recharge the capacitor 6, energy is transferred from the inductance 7 to the capacitor 6 in addition to the charge received from the supply source 1. Accordingly, the charge, on the capacitor 6 is substantially greater than twice the supply voltage, being dependent upon the greater current which is established in the inductance 7 prior to the recharging operation.

Having thus described our invention what we claim is:

1. An electrical chopper regulator circuit comprising DC input terminals; DC output terminals; a first, main controllable rectifier device connected in a current path between said input and output terminals; a commutating capacitor having first and second terminals; means including second and third controllable rectifier devices for connecting said first and second terminals of said communicating capacitor with appropriate polarity to opposite sides of said main controllable rectifier device so as to interrupt current flow in said main controllable rectifier device and to enable said main controllable rectifier device to acquire the forward blocking capability thereof; and charging circuit means for controlling charging of said commutating capacitor from the input terminals and including a switching device and an inductance through which current flows to charge said commutating capacitor to the correct polarity for commutating the main controllable rectifier device before firing of the said main controllable rectifier device.

2. A circuit as claimed in claim 1 wherein said circuit includes switching means for providing, prior to the charging of said commutating capacitor, initial current flow in said inductance such that energy stored in the inductance is transferable to aid in charging said commutating capacitor.

3. A circuit as claimed in claim 1 wherein said switching device of said charging circuit, said inductance, said capacitance, and one of said second and third controllable rectifier devices are connected in that order in a second current path, said switching means for providing initial current flow in said inductance comprising said switching device of said charging circuit means and one of said second and third controllable rectifier devices.

4. A circuit as claimed in claim 3 wherein said switching device of said charging circuit means, said capacitance and said inductance are connected together in that order in a second current path, said switching means providing initial current flow in said inductance comprising one of said second and third controllable rectifier devices.

5. A circuit as claimed in claim 2 wherein the path of said initial current flow includes a load connected between the output terminals.

6. A circuit as claimed in claim 2 wherein the path of said initial current flow excludes a load connected between the output terminals.